United States Patent [19]

Loureiro

[11] Patent Number: 4,473,438
[45] Date of Patent: Sep. 25, 1984

[54] SPRAY DRYING METHOD
[75] Inventor: Valentin R. Loureiro, Teaneck, N.J.
[73] Assignee: Witco Chemical Corporation, New York, N.Y.
[21] Appl. No.: 260,528
[22] Filed: May 4, 1981
[51] Int. Cl.³ ............... B01D 1/14; B01D 1/18
[52] U.S. Cl. ................... 159/4 A; 159/4 GC; 159/4 K; 159/16 R; 159/46; 159/48.1; 55/89; 55/257 R
[58] Field of Search ............ 159/16 R, 16 A, 4 A, 159/48 R, 4 GC, 4 K, 46; 55/89, 257 R

[56] References Cited
U.S. PATENT DOCUMENTS 3,196,930 7/1965 Ebert et al. ............... 159/4 A
3,954,381 5/1976 Marecaux .................. 159/4 A
4,216,053 8/1980 Powell et al. .............. 159/4 A Primary Examiner—Wilbur L. Bascomb, Jr.
Attorney, Agent, or Firm—Wallenstein, Wagner, Hattis, Strampel & Aubel

[57] ABSTRACT

Energy-efficient processes for spray drying aqueous liquids in a spray dryer supplied with furnace-heated drying gas which processes comprise withdrawing the spent drying gas from the spray dryer, spraying the spent drying gas with water adiabatically to cool the gas and increase the water content thereof, and recycling a portion of the humidified gas to the furnace, the recycled portion being from about 40 percent to about 70 percent of the total humidified gas, together with apparatus for carrying out the processes.

4 Claims, 1 Drawing Figure

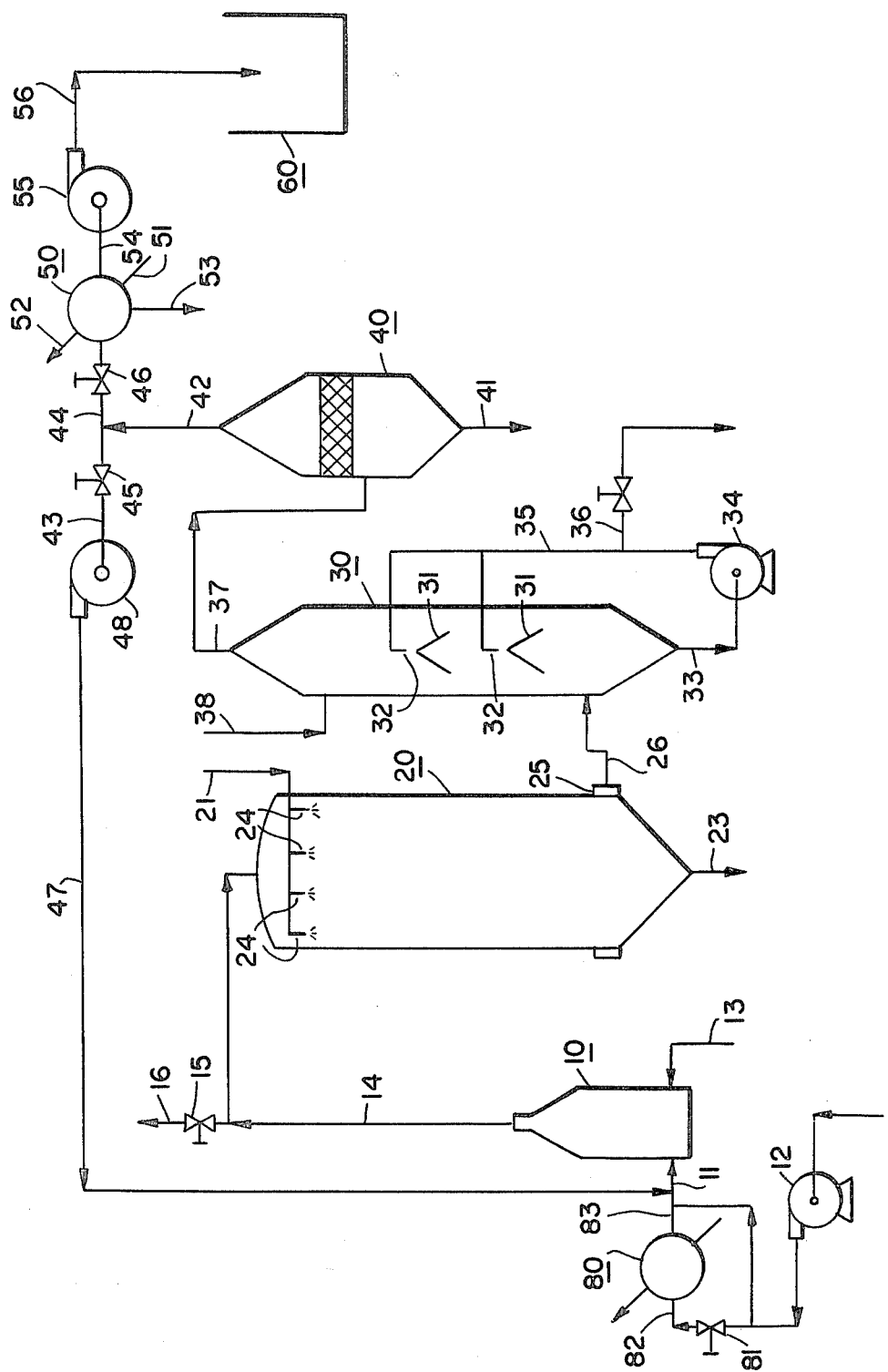

SPRAY DRYING METHOD

BACKGROUND OF THE INVENTION

This invention relates to improved processes and apparatus for spray drying solids-containing liquids, and more particularly, it relates to improvements in such spray drying apparatus having improved efficiency in the use of energy to produce a final spray dried product.

The use of spray driers to provide solid products, and in particular granular or other particulate solid products, from solids-containing liquids is very well known. Generally, such processes are carried out by heating a drying gas by direct or indirect furnace means and introducing the heated gas into a usually vertical column, called a spray drying tower. The tower is also fed with the solids-containing liquid to be dried, the liquid being suitably introduced into the tower, as through spray nozzles, to break up or atomize the liquid into droplets.

The liquid droplets are thus intimately contacted with the drying gas so that the gas can remove a high percentage of the liquid portion of the solids-containing liquid, or slurry, and thus provide solids containing a greater or lesser quantity of the original solvent or dispersing liquid. The dried solids so obtained are removed from the spray tower continuously or incrementally, and the heated gas, which now contains a quantity of the solvent or dispersing liquid, is removed from the tower. Such spray drying towers can be very effective for producing large quantities of particulate solids with relatively good efficiency due to the direct contact between the drying gas and the liquid.

The particulate solids produced in the tower are usually recovered at a temperature which is substantially below the boiling point of the solvent or dispersing liquid. Conventionally, a large quantity of the drying gas has been vented into the atmosphere, perhaps after some solids and/or entrained liquid separation carried out in a cyclone separator for the purpose of removing the small particles which are frequently unavoidably entrained in the drying gas. More recently, with the emphasis on control of emissions from industrial processes, methods have been suggested for recovering a greater quantity, and preferably all, of the particulate material in the drying gas vented from the tower.

One such method is shown in U.S. Pat. No. 4,171,243. The process illustrated there involves the conventional steps of heating the gas, introducing it into a spray drying tower to dry solids, and removing the gas from the tower. Thereafter, the tower effluent gas is led through a cyclone to remove larger particulate solids, and a quantity of gas is then subjected to further treatment, as in an electrostatic separator, to remove finely divided particulates and other contaminants. In order to reduce the load on the electrostatic precipitator and to reduce the quantity of certain organic contaminants emanating from the spray tower in that process, a portion of the drying gas is recycled to the furnace in an attempt to burn the particulates.

This recycled material thus becomes part of the drying gas. The portion which is recycled is either introduced into the furnace directly or is optionally passed through a dust filter to remove fine particulates before they enter the furnace. Caution must be exercised in introducing material into the furnace, lest it adversely affect the product.

THE INVENTION

The present invention provides processes and apparatus for utilizing a large quantity of the heat in the drying gases from the spray tower. The improvements according to the present invention arise through recovery of not only sensible heat from the drying gas, but also the recovery of heretofore wasted latent heat available in the drying gas. The spent hot drying gases leaving the spray tower are scrubbed or sprayed with liquid adiabatically to cool the gases and substantially to approach their dewpoint.

Briefly, the present invention provides spray drying processes for removing water from aqueous liquids containing solids by spraying such liquids into contact with drying gas which has been heated in a furnace, the drying gas removing water from the liquids and thereby forming a water vapor-containing gas, the processes comprising withdrawing the water vapor-containing gas from the spray tower, spraying the withdrawn gas with water substantially adiabatically to cool the gas and increase its water content, dividing the cooled gas into two streams, introducing the first stream into the furnace and venting the second stream to the atmosphere, the ratio of the first stream to the second stream being chosen to provide high heat recovery.

The spray drying apparatus of the present invention accordingly comprise a spray drying tower with an inlet for a liquid composition to be dried to provide a solid product, an outlet for the solid product, an inlet for a heated drying gas, and an outlet for the drying gas; a furnace for heating the drying gas, the furnace having inlets to supply fuel and to supply air, and an outlet for the heated gas; a scrubber having an inlet for aqueous liquid and means for dispersing the liquid in the scrubber, an outlet for liquid, an inlet for receiving the drying gas from the spray drying tower outlet, and an outlet for the aqueous liquid-scrubbed gas; a first conduit connecting the furnace outlet with the tower drying gas inlet; a second conduit connecting the tower drying gas outlet with the scrubber gas inlet; a third conduit connecting the scrubber gas outlet with the furnace gas inlet; and means for apportioning the flow in the third conduit to the furnace inlet.

The present invention will be further described with respect to the accompanying drawing which shows a schematic diagram of particular preferred embodiments.

The practice of the present invention is subject to a number of variations, depending upon the particular operating conditions of the process and apparatus, as will be apparent to those skilled in the art from the present disclosure. The variables which can influence the particular operation hereof include the ambient temperature, the fuel used and its cost, the composition and physical characteristics of the specific liquid slurry to be dried, capital cost and materials of construction for the equipment, utility costs, and environmental considerations.

Referring to various preferred embodiments shown in the drawing, furnace 10 is supplied with air through conduit 11 fed by blower 12, and a fuel such as oil or fuel gas is introduced through line 13. The fuel is burned in the furnace and the resulting hot gas is withdrawn therefrom through line 14, which is directly connected to spray tower 20. Line 14 is also provided with valve 15 communicating with conduit 16, a vent to the atmosphere or a line to scrubbing or other equipment (not shown). The purpose of valve 15 and vent line 16 is to provide for establishment of correct combustion conditions in furnace 10 during start-up procedures. In continuous operation according to the invention, valve 15 is normally closed so that all of the hot gas from furnace 10 is provided to spray tower 20 through line 14.

The solids-containing liquid to be dried is provided to spray tower 20 through line 21. In the embodiment shown, spray tower 20 is provided with a generally conical lower section 22 where the dried solids collect and are withdrawn through conduit 23. The drying gas from line 14 moves vertically downward through the spray drying tower and contacts the liquid to be dried which also moves vertically downward in tower 20. The liquid is suitably atomized in nozzles 24 to provide intimate contact of the drying gas with the liquid slurry to be dried. The drying gas is received in tower plenum 25 and withdrawn from the tower plenum through line 26.

It will be observed that the operation of tower 20 involves the co-current movement of the gas from line 14 and the liquid spray from nozzles 24, so that both the dried product and the exhaust gas from the tower leave at the bottom of tower 20. It will be appreciated that a variety of modes can be used for the actual spray drying. Thus, the present invention can also be used with counter-current drying towers wherein the hot drying gas and the vaporized liquid are introduced at opposite ends of the tower, and pass each other in the tower, such as a tower wherein the slurry is sprayed in at the top and the heated gas moves upwardly through the tower and is withdrawn from the top.

The drying gas withdrawn from the spray tower is conveyed therefrom through line 26 to wet scrubber 30. The wet scrubber represented in the drawing is made by the Ducon Company, Mineola, N.Y., and comprises a number of conical surfaces 31 onto which water is sprayed through nozzles 32 and with vanes (not shown) to establish cyclonic circulation so that the gas entering through line 26 is intimately contacted with the gas, thereby raising the dewpoint of the gas to saturation or near-saturation. In the practice of the present invention, it is preferred to operate so that the gas leaving wet scrubber 30 through line 37 is at least at 90% relative humidity to provide for good heat recovery, and in certain preferred embodiments the gas exiting through line 37 is substantially saturated with water vapor during its adiabatic cooling in scrubber 30.

Some of the water sprayed from nozzles 32 goes to saturate the drying gas entering through line 26. The remainder of the water passing over cones 31 and vanes (not shown) falls to the bottom of scrubber 30 and is removed through line 33. Pump 34 returns the liquid to nozzles 32 by line 35. Additional make-up water to replace that used to saturate the gas is introduced into scrubber 30 through line 38. In practice, particulates carried over in the drying gas are also removed from the gas and pass through line 33. Line 36 is provided for the removal of slurry from the wet scrubber so that the solids content of the liquid recirculated through line 35 can be controlled.

The saturated gases withdrawn through line 37 are introduced into demister 40 which separates solid particles from the gas stream. The removed particulates are withdrawn through line 41, while the gases themselves are withdrawn from demister 40 by means of line 42. The stream of line 42 is divided so that a first portion passes into line 43 and a second portion passes into line 44. The relative quantity in lines 43 and 44 is adjusted with valves or dampers 45 and 46. Line 45 communicates with recirculating fan 48. Fan 48 feeds the cooled, substantially saturated gas into line 47, which communicates with line 11 so that input air is combined with the recycled gas in line 47, and both are then fed to furnace 10.

The recycle ratio of the gas in line 43 to that in line 44 is determined by a number of factors. The recycle ratio is desirably high to recover as much heat as possible. If the recycle ratio is to high, however, there will be insufficient oxygen fed to furnace 10 through line 11 to sustain complete combustion of the fuel fed through line 13. A very low recycle ratio requires the consumption of too much energy to recover the heat of the gases in line 42. It has been found that a recycle ratio of 70%, that is, 70% of the gas passing through line 43 and 30% passing through line 44, is about the maximum desirable, while the recycle ratio should be at least 40%. Thus, the desirable recycle ratios are 40% to 70%, with from about 45% to about 60% being preferred. In certain embodiments of the invention, a 50% recycle ratio provides excellent results, and under these conditions, a recycle ratio of about 50% is especially preferred.

The portion of the saturated drying gas in line 44 can be vented to the atmosphere directly since its particulate solids content is very low. In the embodiment shown, the gas in line 44 is introduced into exhaust condenser 50 supplied with cooling water through line 51. The cooling water in the exhaust condenser is withdrawn through line 52, and the condensed vapors are withdrawn through line 53. The condensed fluid in line 53 can be used to provide energy for space heating or other process applications in the plant.

If desired, the condensed vapors can be introduced into optional intake gas heater 80 for the purpose of recovering additional energy by raising the temperature of the gases in line 14. The condensed vapors flow through line 53 to conduit 84 in intake gas heater 80. Valve or damper 81 can be used to admit the input fresh air to line 82. The heated input air from heater 80 leaves through line 83 and joins lines 11 and 47.

The gases leaving exhaust condenser 50 through line 54 are boosted through fan 55 into line 56, whence they proceed to knockdown tank 60. While not essential in certain embodiments of the invention, knockdown tank 60 is useful for start-up of for operation under upset conditions in the event that a surge or other transient condition occurs in the spray drying system itself.

To enhance understanding of the presently claimed invention, there follow a number of Examples. In the Examples which follow, the various flow rates and quantities of energy are based on one hour of operation.

The following Examples are given to illustrate embodiments of the invention as it is presently preferred to practice it. It will be understood that these Examples are illustrative, and the invention is not to be considered as restricted thereto except as indicated in the appended claims.

EXAMPLE I

In operation of an apparatus according to the present invention, 31,140 lbs. of dry air at 90° F. is introduced through line 11 into furnace 10, and sufficient fuel gas is fed through line 13 to cause substantially complete combustion. Heated gases are withdrawn through line 14 at about 1000° F. and are introduced into the top of spray drying tower 20. A detergent slurry from a crutcher is introduced into line 22. The quantity of slurry is 31,600 lbs., of which 19,600 lbs is solids and 12,000 lbs. is water. The dried detergent powder obtained by the drying operation and withdrawn through line 23 amounts to 17,600 lbs. of solids and 550 lbs. of water.

The gas withdrawn through line 26 is at a temperature of 250° F. and has a dewpoint of 155° F. Four thousand pounds of water is introduced into scrubber 30 through line 38, and 4000 lbs. of slurry, of which 2000 lbs. is water, is withdawn through line 36. It has been found that this slurry concentration avoids the foaming which might otherwise occur in the Ducon scrubber. The gases withdrawn through line 37 are at a temperature of 175° F. and are substantially saturated with moisture. Following passage of the hot gases through demister 40, the gases in line 42 are still substantially saturated at a temperature of 175° F.

The demister is found effectively to avoid the escape of particulate material and thereby obviates the production of small charred particles in furnace 10. Such charred particles would tend to be removed with the dried product through line 23 and could degrade the appearance of the dried product.

The 175° F. gases in line 42 are equally divided between lines 43 and 44. The material in line 43 re-enters furnace 10 through line 47 and thence line 11.

If condenser 50 is utilized, it reduces the temperature of the gases in line 54 to about 150° F. and can result in recovery of 7,785,000 Btus. The recirculation of gas through lines 43, 47 and 11 results in a saving of about one and a half million Btus.

EXAMPLE II

The apparatus of Example I is run without any recycle through line 43. The scrubber is simply used to remove particulates from the stream. The operation in this mode requires an additional one and a half million Btus of fuel gas in order to obtain the same production rate.

The foregoing Examples typify the results of the present invention under summer conditions. With the lower ambient air temperatures encountered in winter operations, the increase of efficiency is even greater.

What is claimed is:

1. A spray-drying process for removing water from aqueous mixtures by spraying the aqueous mixture into contact with a furnace-heated drying gas to remove water from the mixture and form a water vapor-containing drying gas, the process comprising withdrawing the water vapor-containing gas from contact with the mixture, spraying the withdrawn gas with water substantially adiabatically to cool the gas and increase the water content thereof, dividing the cooled withdrawn gas into two streams, introducing the first stream into the furnace and venting the second stream to the atmosphere, the ratio of the first stream to the second stream being from 40:60 to 70:30, wherein the second stream is cooled with a fluid prior to venting, which fluid is thereby warmed, and the fluid so warmed is used to heat incoming gas to the furnace.

2. A process according to claim 1, wherein the water content of the withdrawn gas is increased to at least about 90 percent of saturation.

3. A process according to claim 1 wherein the water content of the withdrawn gas is increased to substantial saturation.

4. A process according to claim 1 wherein the withdrawn cooled gas stream contains particulate material and is passed through a gas separator to remove substantially all the particulate material in the stream.

* * * * *